United States Patent
Park et al.

(10) Patent No.: US 9,316,792 B2
(45) Date of Patent: Apr. 19, 2016

(54) OPTICAL COUPLER AND OPTICAL DEVICE INCLUDING THE SAME

(71) Applicant: Electronics and Telecommunications Research Institute, Daejeon (KR)

(72) Inventors: Hyundai Park, Daejeon (KR); Taeyong Kim, Daejeon (KR); JiHo Joo, Daejeon (KR); Jaegyu Park, Daejeon (KR); Gyungock Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 175 days.

(21) Appl. No.: 14/159,355

(22) Filed: Jan. 20, 2014

(65) Prior Publication Data

US 2015/0277054 A1    Oct. 1, 2015

(30) Foreign Application Priority Data

Mar. 25, 2013   (KR) .................. 10-2013-0031517

(51) Int. Cl.
| | |
|---|---|
| *G02B 6/26* | (2006.01) |
| *G02B 6/42* | (2006.01) |
| *G02B 6/30* | (2006.01) |
| *G02B 6/122* | (2006.01) |
| G02B 6/14 | (2006.01) |
| G02B 6/12 | (2006.01) |

(52) U.S. Cl.
CPC ............. *G02B 6/305* (2013.01); *G02B 6/1228* (2013.01); *G02B 6/12002* (2013.01); *G02B 6/14* (2013.01); *G02B 2006/12092* (2013.01)

(58) Field of Classification Search
CPC .... G02B 6/12002; G02B 6/1228; G02B 6/14; G02B 6/305; G02B 2006/12092
USPC ..................................................... 385/43, 50
See application file for complete search history.

(56) References Cited

U.S. PATENT DOCUMENTS

| | | | |
|---|---|---|---|
| 7,088,890 B2 * | 8/2006 | Liu | ........................ B82Y 20/00 385/129 |
| 7,643,710 B1 | 1/2010 | Liu | |
| 8,254,737 B2 | 8/2012 | Choudhury et al. | |
| 2004/0017976 A1 * | 1/2004 | Luo | ...................... G02B 6/1228 385/43 |

OTHER PUBLICATIONS

Anatol Khilo et al., "Efficient planar fiber-to-chip coupler based on two-stage adiabatic evolution", Optics Express, Jul. 19, 2010, pp. 15790-15806, vol. 18 No. 15.

* cited by examiner

*Primary Examiner* — Ryan Lepisto

(57) ABSTRACT

Provided are an optical coupler and an optical device including the same. The optical coupler includes: a substrate; a buffer layer on the substrate; and an optical coupling layer including a horizontal mode expander layer and a vertical mode expander layer, wherein the horizontal mode expander layer expands in one direction on the buffer layer, and wherein the vertical mode expander layer adjusts a stepped difference between the horizontal mode expander layer and a plurality of optical transmission devices having different diameters or sectional areas and connected to both sides of the horizontal mode expander layer, and the vertical mode expander layer is disposed on a side of the horizontal mode expander layer to minimize optical loss between the plurality of optical transmission devices.

16 Claims, 9 Drawing Sheets

82

84

OPTICAL COUPLER AND OPTICAL DEVICE INCLUDING THE SAME

CROSS-REFERENCE TO RELATED APPLICATIONS

This U.S. non-provisional patent application claims priority under 35 U.S.C. §119 of Korean Patent Application No. 10-2013-0031517, filed on Mar. 25, 2013, the entire contents of which are hereby incorporated by reference.

BACKGROUND OF THE INVENTION

The present invention disclosed herein relates to an optical device, and more particularly, to an optical device capable of minimizing optical loss and an optical device including the same.

In general, an optical signal may be delivered along an optical waveguide or an optical fiber. Optical devices of an optical integrated circuit may be connected to an optical waveguide or an optical fiber. Additionally, the optical waveguide and the optical fiber may be connected to each other. When an optical device, an optical waveguide, and an optical fiber are connected to each other, optical loss needs to be minimized essentially during low-power and high-speed optical transmission. For example, the width and thickness of an optical waveguide for optical integrated circuit are 20 times to 450 times less than a core size of an optical fiber. Direct connection of an optical waveguide and an optical fiber may lead to high optical loss reaching about 10 dB to about 20 dB.

In order to solve the above issue, an optical coupler configured with a second waveguide having a reverse taper and overlaying waveguide with a similar refractive index to an optical fiber was suggested. The second waveguide may have advantages of low polarization or small wavelength dependence compared to a vertical incidence type grating coupler. However, when the second waveguide is coupled to a single-mode optical fiber, it requires several centimeters (cm) of a reverse taper length for low optical loss.

Because of such realistic constraints, a typical optical coupler described above may be connected to an optical fiber with a small core having a smaller core size than a single mode optical fiber. However, the optical fiber with the small core causes optical coupling efficiency to be deteriorated due to misalignment between an optical fiber and a waveguide, and also causes productivity to be lowered due to increase in optical module packaging costs.

SUMMARY OF THE INVENTION

The present invention provides an optical coupler capable of minimizing optical loss and an optical device including the same.

The present invention also provides an optical coupler capable of improving productivity and an optical device including the same.

Embodiments of the present invention provide optical couplers including: a substrate; a buffer layer on the substrate; and an optical coupling layer including a horizontal mode expander layer and a vertical mode expander layer, wherein the horizontal mode expander layer expands in one direction on the buffer layer, and wherein the vertical mode expander layer adjusts a stepped difference between the horizontal mode expander layer and a plurality of optical transmission devices having different diameters or sectional areas and connected to both sides of the horizontal mode expander layer, and the vertical mode expander layer is disposed on a side of the horizontal mode expander layer to minimize optical loss between the plurality of optical transmission devices.

In some embodiments, the horizontal mode expander layer of the optical coupling layer may include: a waveguide coupling region disposed on a side facing the vertical mode expander layer and having a first width that is higher than a width of one of the plurality of optical transmission devices; a horizontal expander region connected to the waveguide coupling region and having a first divergence width that is gradually increased in a direction away from the waveguide coupling region; and a vertical expander region connected to the horizontal expander region and having a second width that is same as a width of the other one of the plurality of optical transmission devices. The second width is higher than the first width.

In other embodiments, the second width of the vertical expander region and a height of the optical coupling layer may be the same.

In still other embodiments, the vertical mode expander layer may be disposed on the vertical expander region restrictively.

In even other embodiments, the vertical mode expander layer may have a second divergence width that is gradually increased in a direction away from the horizontal expander region of the optical coupling layer.

In yet other embodiments, the vertical mode expander layer may have a structure in which a plurality of vertical mode expander sub-layers are stacked such that heights of the plurality of vertical mode expander sub-layers may be increased in a stepwise fashion in a direction away from the horizontal expander region.

In further embodiments, the vertical mode expander layer may be inclined to have a height that is increased as progressively away from the horizontal expander region.

In further embodiments, the optical coupling layer may include a silicon oxynitride layer.

In further embodiments, the buffer layer may include a silicon oxide layer.

In further embodiments, the substrate may include silicon.

In other embodiments of the present invention, optical devices include: a substrate; a buffer layer on the substrate; an optical waveguide disposed at one side of the buffer layer; an optical fiber disposed at the other side of the buffer layer; and an optical coupling layer including a horizontal mode expander layer between the optical fiber and the optical waveguide, and a vertical mode expander layer disposed on the horizontal mode expander layer connected to the optical fiber.

In some embodiments, the optical waveguide may have a less width and thickness than a sectional area of the optical fiber.

In other embodiments, the optical waveguide may be inserted into the horizontal expander layer of the optical coupling layer.

In still other embodiments, the optical waveguide may have a straight region disposed on an outside of the optical coupling layer, and the optical waveguide has a tapered region disposed in the optical coupling layer and having a less width than the straight region.

In even other embodiments, the horizontal mode expander layer of the optical coupling layer may have: a waveguide coupling region disposed on the other side facing the vertical mode expander layer and having a first width; a horizontal expander region connected to the waveguide coupling region and having a first divergence width that is gradually increased in a direction away from the waveguide coupling region; and a vertical expander region connected to the horizontal expander region and having a second width that is higher than the first width.

In yet other embodiments, the tapered region may be disposed in the waveguide coupling region restrictively.

In further embodiments, the horizontal mode expander layer and the vertical mode expander layer may have the same width and thickness as the diameter of the optical fiber.

In still further embodiments, the optical waveguide may include silicon.

In even further embodiments, the optical coupling layer may include a silicon oxynitride layer.

In yet further embodiments, the optical fiber may include silica or a compound having a less refractive index than the silicon and a greater refractive index than the silicon oxynitride layer.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
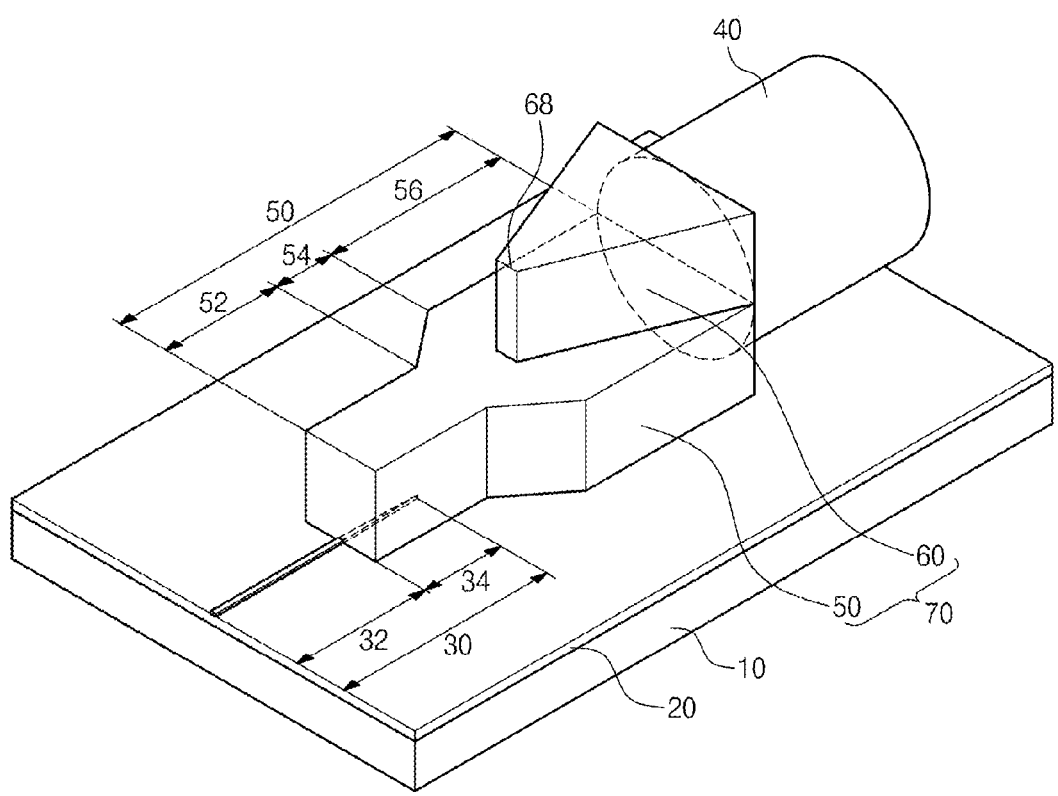
FIG. 1 is a perspective view illustrating an optical device according to a first embodiment of the present invention.
Figure 2A:
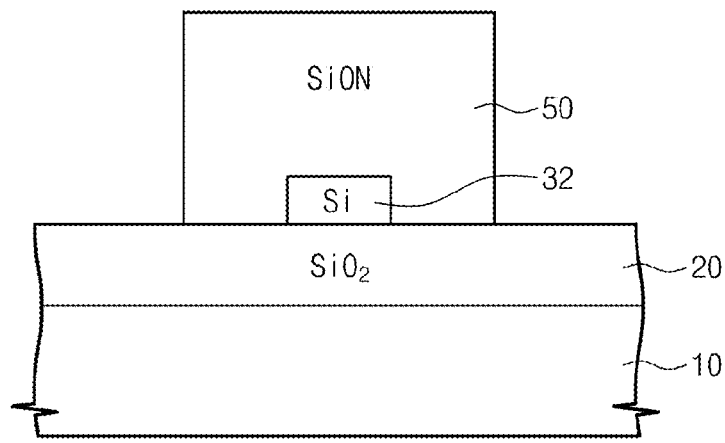
FIGS. 2A to 2D are sectional views sequentially illustrating sectional areas of an optical coupler of FIG. 1.
Figure 2B:
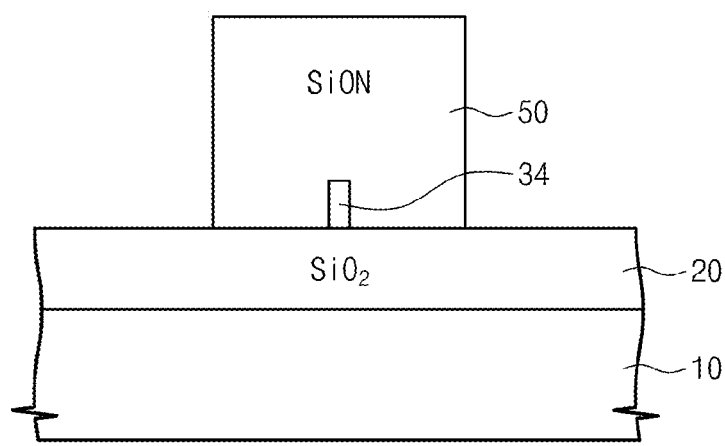
Figure 2C:
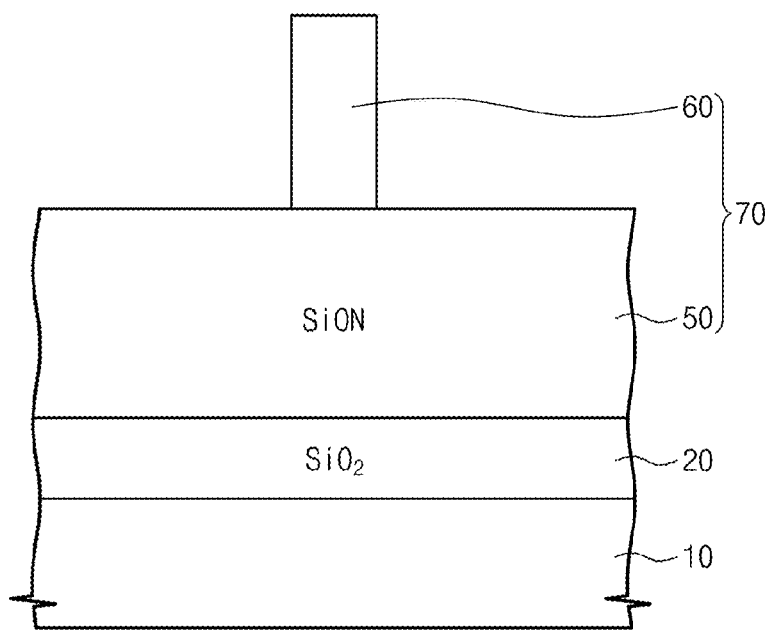
Figure 2D:
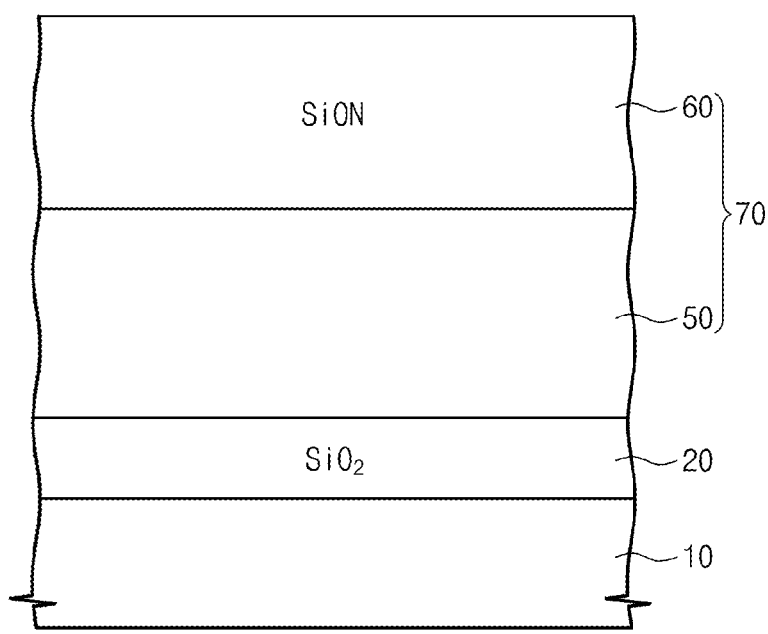
Figure 3A:
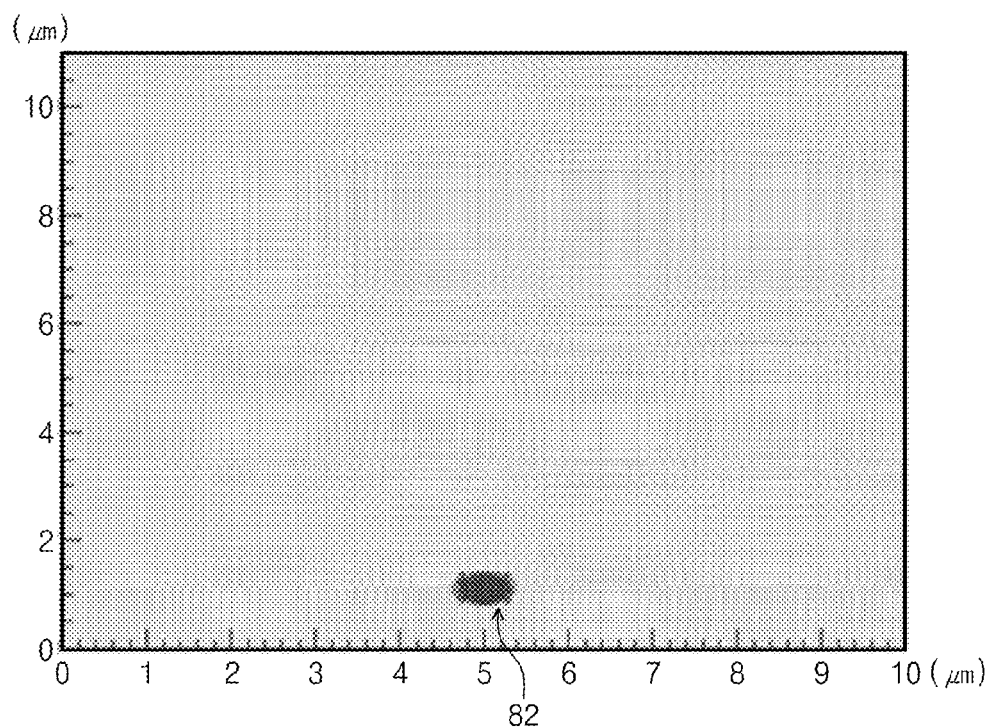
FIGS. 3A to 3D are views illustrating an optical mode calculated from the sectional areas of the optical coupler in FIGS. 2A to 2D.
Figure 3B:
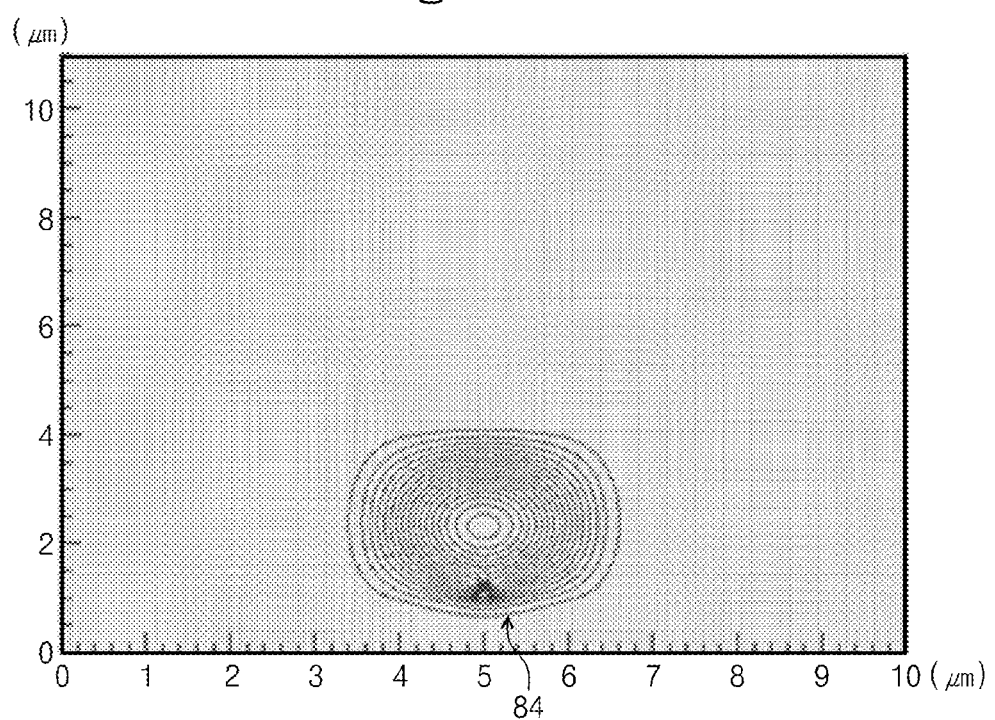
Figure 3C:
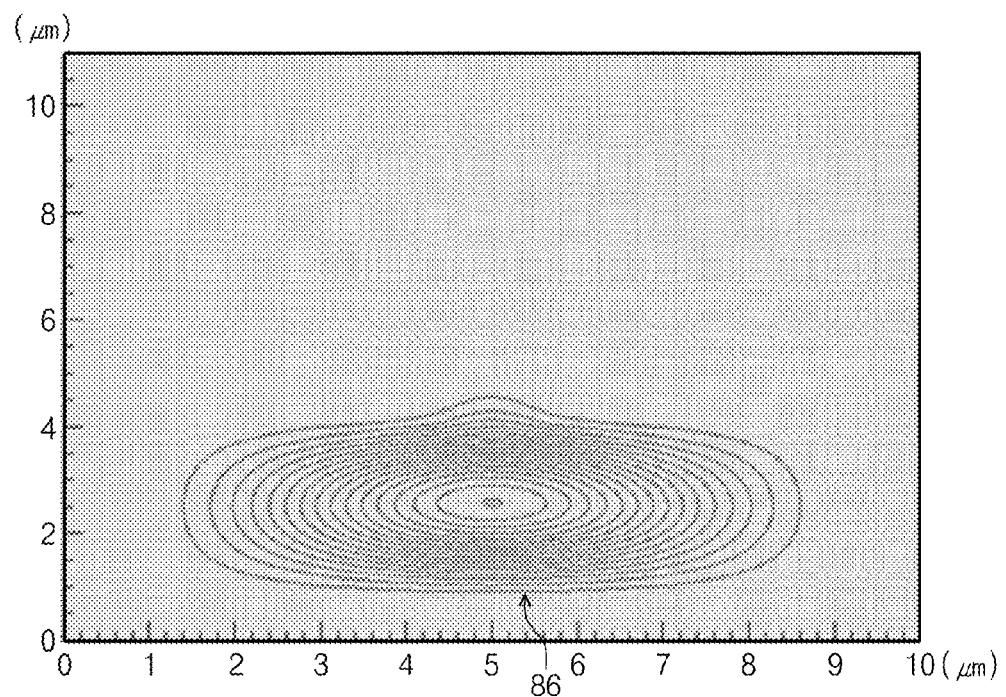
Figure 3D:
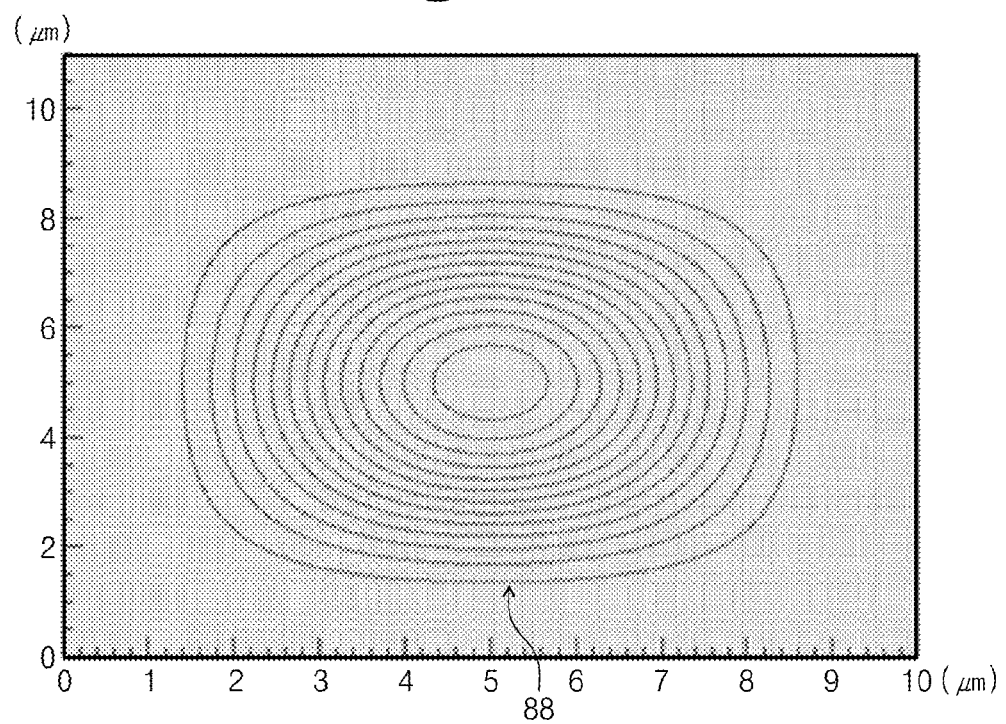

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Therefore, in some embodiments, well-known processes, device structures, and technologies will not be described in detail to avoid ambiguousness of the present invention. An embodiment described and exemplified herein includes a complementary embodiment thereof. Like reference numerals refer to like elements throughout.

In the following description, the technical terms are used only for explaining specific embodiments while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Additionally, the embodiment in the detailed description will be described with sectional views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the present invention.

Hereinafter, it will be described about an exemplary embodiment of the present invention in conjunction with the accompanying drawings.

FIG. 1 is a perspective view illustrating an optical device according to a first embodiment of the present invention.

Referring to FIG. 1, the optical device includes a substrate 10, a buffer layer 20, an optical waveguide 30, an optical fiber 40, and an optical coupler 70.

The substrate 10 may provide a flat surface. The buffer layer 20 may have a lower refractive index than the substrate 10. The substrate 10 may include a silicon wafer. The buffer layer 20 may include a silicon oxide layer having a lower refractive index than silicon. Silicon may have a refractive index of about 3.4. The silicon oxide layer may have a refractive index of about 1.45.

The optical waveguide 30 may be disposed on one side of the buffer layer 20 in one direction. The optical waveguide 30 may include crystalline silicon, polycrystalline silicon, or amorphous silicon, each of which has a higher refractive index than the buffer layer 20. The present invention is not limited thereto and thus various modifications for implementation may be made therein. Although not shown in the drawings, the optical waveguide 30 may be a ridge waveguide protruding on the substrate 10.

The optical fiber 40 may be disposed on the other side of the buffer layer 20 facing the optical waveguide 30. The optical waveguide 30 and the optical fiber 40 may extend in the same direction as being separated from each other. The optical fiber 40 may include a single-mode optical fiber. The optical waveguide 30 may a smaller width and thickness than the optical fiber 40.

The optical coupler 70 may connect the optical waveguide 20 and the optical fiber 40. The optical coupler 70 may include a silicon oxynitride layer having a lower refractive index than silicon used for the optical waveguide 30. The optical fiber 40 may include silica or a compound having a higher refractive index than a silicon oxynitride layer but a lower refractive index than silicon. The optical coupler 70 includes a horizontal mode expander layer 50 and a vertical mode expander layer 60. The horizontal mode expander layer 50 may be commonly connected to the optical waveguide 30 and the optical fiber 40. The vertical mode expander layer 60 may be selectively connected to only the optical fiber 40.

The horizontal mode expander layer 50 may have a waveguide coupling region 52, a horizontal expander region 54, and a vertical expander region 36. The waveguide coupling region 52 is connected to the optical waveguide 30. The optical waveguide 30 may have a less width and thickness than a sectional area of the waveguide coupling region 52. The waveguide coupling region 52 may have a uniform width and thickness. That is, the waveguide coupling region may have a width being higher than that of the optical waveguide 30. The optical waveguide 30 may be inserted into the waveguide coupling region 52 restrictively. That is, the waveguide coupling region 52 is a region into which the optical waveguide 30 is inserted. The optical waveguide 30 includes a straight region 32 outside the waveguide coupling region 52 of the horizontal mode expander layer 40, and a tapered region 34 in the waveguide coupling region 52. The straight region 52 may have a uniform width and thickness. Additionally, the tapered region 34 may have a width that becomes further reduced progressively as being away from the straight region 32. The end of the taper region 32 may be disposed in the waveguide coupling region 52 restrictively. The straight region 32 and the tapered region 34 may have the same thickness.

The horizontal expander region 54 is a region in which a width thereof is progressively increased as being away from the optical waveguide 30 or the waveguide coupling region 52. Additionally, the horizontal expander region 54 is a region connecting the waveguide coupling region 52 and a vertical expander region 56. The vertical expander region 56 may have a greater width than the waveguide coupling region 52. For example, the vertical expander region 56 may have the same width as the optical fiber 40. The waveguide coupling region 52 and the vertical expander region 54 may have different uniform widths. Accordingly, the horizontal expander region 54 may have a width that is progressively increased from the waveguide coupling region 52 to the vertical expander region 56. That is, the horizontal expander region 54 may have a tapered width that is gradually increased in a direction away from the waveguide coupling region 52.

The vertical expander region 56 is a region on which the vertical mode expander layer 60 is disposed. That is, in the vertical expander region 56, the horizontal mode expander layer 50 and the vertical mode expander layer 60 are in direct contact with each other, and a boundary therebetween may not be distinguishable.

The vertical mode expander layer 60 may have a uniform thickness on the vertical expander region 56 of the horizontal mode expander layer 50. The vertical mode expander layer 60 may have a width that is tapered in a reverse direction from the optical waveguide 30 to the optical fiber 40. The vertical mode expander layer 60 tapered in a reverse direction may be referred to as a reverse tapered vertical mode expander layer.

FIGS. 2A to 2D are sectional views sequentially illustrating sectional areas of the optical coupler 70 of FIG. 1. FIGS. 3A to 3D are views illustrating an optical mode calculated from the sectional areas of the optical coupler 70 in FIGS. 2A to 2D. Here, horizontal axes of FIGS. 3A to 3D correspond to a width of the horizontal mode expander layer 50, and vertical axes of FIGS. 3A to 3D correspond to heights of the horizontal mode expander layer 50 and the vertical mode expander layer 60.

Referring to FIGS. 1 and 2A to 3D, widths and height of optical modes may be increased gradually while light is guided and propagates from the waveguide coupling region 52 to the vertical expander region 56. A first optical mode 82 in the waveguide coupling region 52 may have the minimum width and height which are same as those of the optical waveguide 30 (see FIGS. 2A and 3A). A second optical mode 84 may have a greater width and height than the optical waveguide 30 at the boundary between the waveguide coupling region 52 and the horizontal expander region 54 (see FIGS. 2B and 3B). The second optical mode 84 may have a more increased width and height than the first optical mode 82. A third optical mode 86 at the boundary between the horizontal expander region 54 and the vertical expander region 56 may have a similar width to the horizontal expander region 54 (see FIGS. 2C and 3C). The third optical mode 86 may have a more increased width than the second optical mode 84. The second optical mode 84 and the third optical mode 86 may have the same height. A fourth optical mode 88 in the vertical expander region 56 may have a similar height and width to the horizontal mode expander layer 50 and the vertical mode expander layer 60 of the horizontal expander region 54. The fourth optical mode 88 may have a more increased height than the third optical mode 86.

The vertical mode expander layer 60 may be disposed on the vertical expander region 56 of the horizontal mode expander layer 50 restrictively. That is, a tip 68 of the vertical mode expander layer 60 exists only on the vertical expander region 56. According to the width of the tip 68, optical loss may vary.

Figure 4:
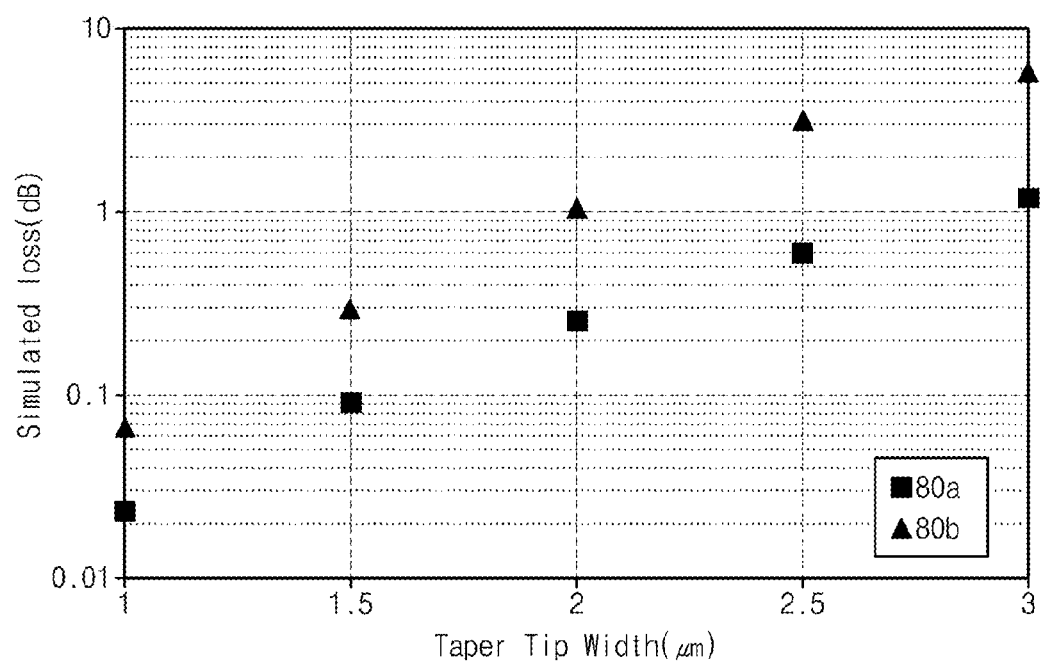
FIG. 4 is a graph illustrating optical loss calculated depending on a sectional width of a tip of a vertical mode expander layer.

FIG. 4 is a graph illustrating optical loss calculated depending on a sectional width of the tip 68 of the vertical mode expander layer 60.

Referring to FIGS. 1 and 4, as the width of the tip 68 of the vertical mode expander layer 60 becomes smaller, optical loss is further reduced. A first structure 80a is that the tip 68 of the vertical mode expander layer 60 exists on the vertical expander region 56 (see FIG. 1). A second structure 80b is that the tip 68 of the vertical mode expander layer 60 exits on the horizontal expander region 54. In the first structure 80a, when the width of the tip 68 is about 2 μm or less, optical loss may be about 0.3 dB or less. In contrast, in the second structure 80b, when the width of the tip 68 is about 2 μm or less, optical loss may be about 1 dB or less. The first structure (see FIG. 1) may have optical loss smaller than the second structure (not shown) in which the tip 68 is on the horizontal expander region 54.

The reason for reduced optical loss is that a horizontal expansion and a vertical expansion of an optical mode are not performed simultaneously but are performed separately. That is, the reason for reduced optical loss is that a horizontal expander region is separated from a vertical expander region. An optical mode may expand horizontally in the horizontal mode expander layer 50 of the horizontal expander region 54 and then may expand vertically in the horizontal mode expander layer 50 and the vertical mode expander layer 50 of the vertical expander region 56. The optical coupler 70 may have optical loss proportional to the width of the tip 68 of the vertical mode expander layer 60. If the width of the tip 68 is reduced to about 1 μm or less, the optical coupler 70 may deliver an optical signal with almost no optical loss. Therefore, the optical device according to this embodiment of the present invention may minimize optical loss.

Figure 5:
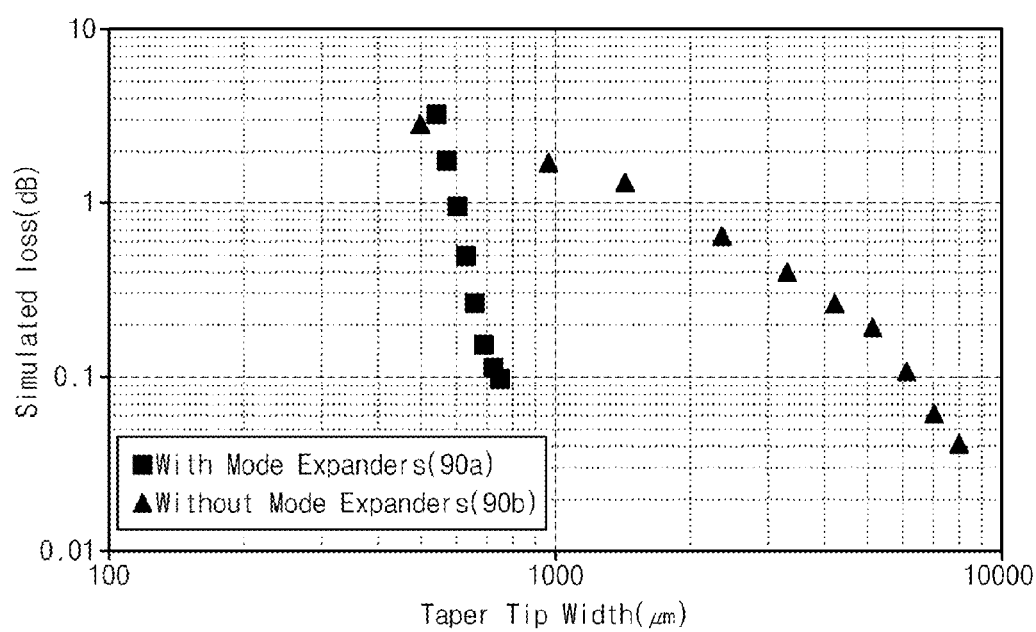
FIG. 5 is a comparison graph illustrating optical losses calculated depending on lengths of the optical coupler of the present invention and a typical optical coupler, wherein the optical coupler of the present invention includes the horizontal mode expander layer and the vertical mode expander layer and the typical optical coupler includes a reverse tapered silicon waveguide a second waveguide with a predetermined size.

FIG. 5 is a comparison graph illustrating optical losses calculated depending on lengths of the optical coupler of the present invention and a typical optical coupler, wherein the optical coupler of the present invention includes the horizontal mode expander layer and the vertical mode expander layer and the typical optical coupler includes a reverse tapered silicon waveguide a second waveguide with a predetermined size.

Referring to FIGS. 1 and 5, the optical coupler 70 of the present invention may reduce optical loss due to a length shorter than that of a typical optical coupler including a second waveguide with a predetermined size. When the optical coupler 70 has a length of about 750 μm or more, optical loss may be about 0.1 dB or less (see 90a in FIG. 5). When a typical reverse tapered optical coupler (not shown) is designed with a length of more than about 6 mm, optical loss may be about 0.1 dB or less (see 90b in FIG. 5). The optical coupler 70 having optical loss of less than about 0.1 dB may be commercialized and standardized. Accordingly, the optical device according to the first embodiment of the present invention may include the optical coupler 70 connecting the optical waveguide 30 and the optical fiber 40 with the minimum distance therebetween. The optical coupler 70 having the minimized distance reduces chip costs of an optical coupling circuit and packaging costs by improving optical coupling efficiency with an optical fiber having a large sectional area. Therefore, productivity may be improved.

Figure 6:
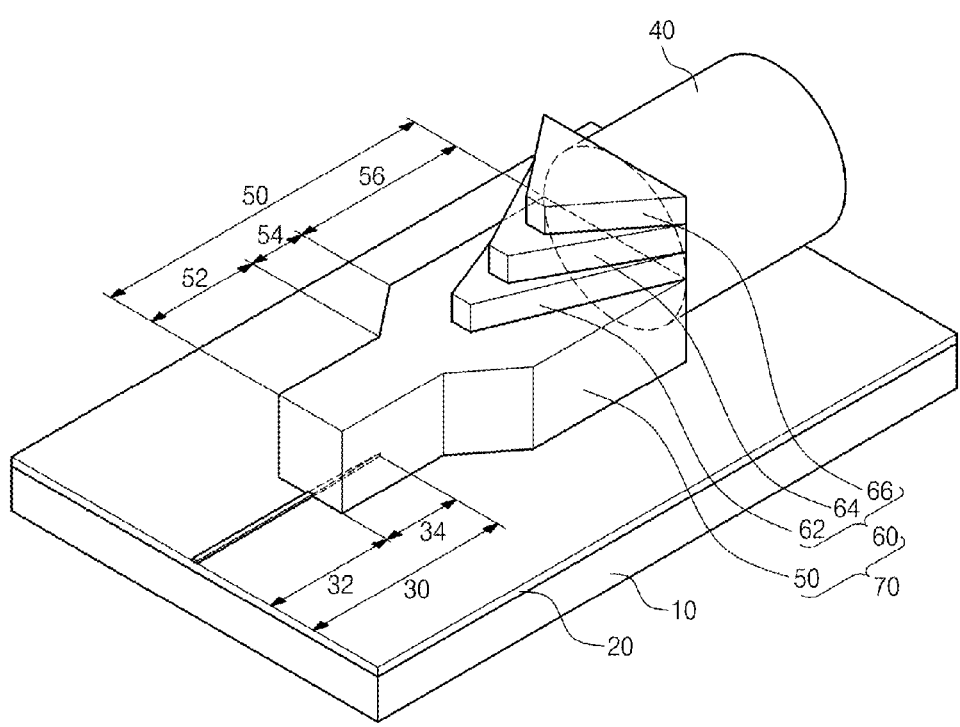
FIG. 6 is a perspective view illustrating an optical device according to a second embodiment.

FIG. 6 is a perspective view illustrating an optical device according to a second embodiment.

Referring to FIG. 6, the optical device may include an optical coupler 70 including a plurality of vertical mode expander layers 60 having a stair structure. The vertical mode expander layers 60 include a first vertical mode expander layer 62, a second vertical mode expander layer, and a third vertical mode expander layer 68. The second vertical mode expander layer 64 may be shorter than the first vertical mode expander layer 62. The third vertical mode expander layer 68 may be shorter than the second vertical mode expander layer 64. In the second embodiment of the present invention, the vertical mode expander layer 60 of the optical coupler 70 in the first embodiment of the present invention is modified such that it includes the first to third vertical mode expander layers 62, 64, and 66 that are stacked in a plurality of step forms.

Figure 7:
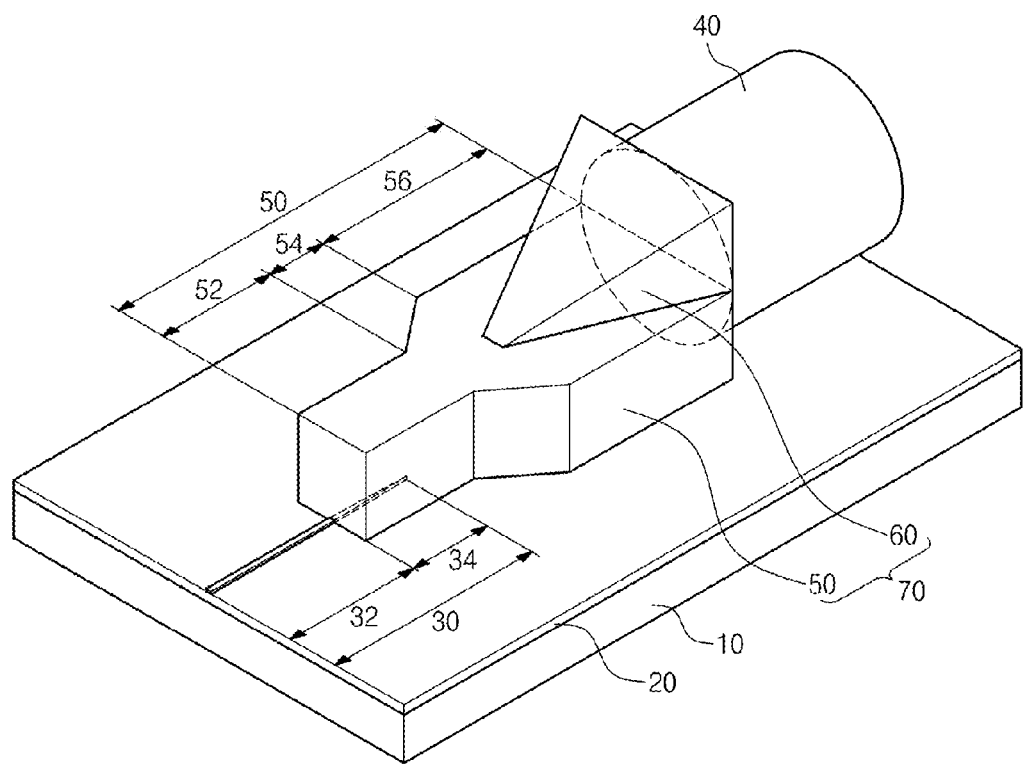
FIG. 7 is a perspective view illustrating an optical device according to a third embodiment of the present invention.

FIG. 7 is a perspective view illustrating an optical device according to a third embodiment of the present invention.

Referring to FIG. 7, the optical device includes an optical coupler 70 including a vertical mode expander layer 60. The vertical mode expander layer 60 may be inclined to have its thickness that is increased as being progressively closer to the optical fiber 40. The tilt angle may be inversely proportional to the lengths of the vertical mode expander layer 60 and the vertical expander region 56. In the third embodiment of the present invention, the horizontal mode expander layer 60 in the first embodiment is modified such that it is inclined to have a thickness that is increased gradually in a direction from the optical waveguide 30 to the optical fiber 40.

According to embodiments of the present invention, an optical coupler may include a horizontal mode expander layer and a vertical mode expander layer. The horizontal mode expander layer may extend in one direction. The vertical mode expander layer may be disposed on one side of the horizontal mode expander layer. The horizontal mode expander layer may be connected to an optical waveguide and an optical fiber. The optical waveguide has a sectional area smaller than the diameter of the optical fiber. The horizontal mode expander layer may have a waveguide coupling region, a horizontal expander region, and a vertical expander region. The waveguide coupling region is a region to which the optical waveguide and the horizontal mode expander layer are connected. The optical waveguide may be inserted into the horizontal mode expander layer. The vertical expander region may have a width greater than the waveguide coupling region. The horizontal expander region is a region connecting the waveguide coupling region and the vertical expander region. The vertical mode expander layer may be disposed in a reverse tapered shape on the vertical expander region. The horizontal mode expander layer and the vertical mode expander layer in the vertical expander region may be connected to the optical fiber. The optical fiber may have a diameter equal to the width and height of the horizontal mode expander layer and the vertical mode expander layer. The optical coupler may have optical loss that is proportional to the width of a tip of a vertical mode expander layer having a reverse tapered form. When the width of the tip of the vertical mode expander layer is reduced to about 1 μm or less, the optical coupler can deliver an optical signal with almost no optical loss. Additionally, a reverse tapered vertical mode expander layer on a horizontal mode expander layer can significantly reduce the length of the optical coupler, compared to a typical optical coupler including a second waveguide having a predetermined section. The length reduction of the optical coupler can reduce manufacturing costs for an optical coupling circuit or an optical device.

Therefore, an optical coupler and an optical device including the same according to embodiments of the present invention can improve productivity.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical coupler comprising:
a substrate;
a buffer layer on the substrate; and
an optical coupling layer including a horizontal mode expander layer and a vertical mode expander layer,
wherein the horizontal mode expander layer expands in one direction on the buffer layer, and
wherein the vertical mode expander layer adjusts a stepped difference between the horizontal mode expander layer and a plurality of optical transmission devices having different diameters or cross-sectional areas and connected to first and second sides of the horizontal mode expander layer, and the vertical mode expander layer is disposed on a side of the horizontal mode expander layer to minimize optical loss between the plurality of optical transmission devices, and
wherein the horizontal mode expander layer of the optical coupling layer comprises:
a waveguide coupling region disposed on the first side of the vertical mode expander layer and having a first width that is greater than a width of one of the plurality of optical transmission devices;
a horizontal expander region connected to the waveguide coupling region and having a first divergence width that gradually increases in a direction away from the waveguide coupling region; and
a vertical expander region connected to the horizontal expander region and having a second width that is same as a width of another one of the plurality of optical transmission devices,
wherein the second width is greater than the first width.

2. The optical coupler of claim 1, wherein the second width of the vertical expander region and a height of the optical coupling layer are the same.

3. The optical coupler of claim 1, wherein the vertical mode expander layer is disposed on the vertical expander region restrictively.

4. The optical coupler of claim 3, wherein the vertical mode expander layer has a second divergence width that gradually increases in a direction away from the horizontal expander region of the optical coupling layer.

5. The optical coupler of claim 4, wherein the vertical mode expander layer has a structure in which a plurality of vertical mode expander sub-layers are stacked such that heights of the plurality of vertical mode expander sub-layers are increased in a stepwise manner in a direction away from the horizontal expander region.

6. The optical coupler of claim 4, wherein the vertical mode expander layer is inclined to have a height that increases progressively away from the horizontal expander region.

7. The optical coupler of claim 1, wherein the optical coupling layer comprises a silicon oxynitride layer.

8. The optical coupler of claim 1, wherein the buffer layer comprises a silicon oxide layer.

9. The optical coupler of claim 1, wherein the substrate comprises silicon.

10. An optical device comprising:
a substrate;
a buffer layer on the substrate;
an optical waveguide disposed at a first side of the buffer layer;
an optical fiber disposed at a second side of the buffer layer; and
an optical coupling layer including a horizontal mode expander layer between the optical fiber and the optical waveguide, and a vertical mode expander layer disposed on the horizontal mode expander layer connected to the optical fiber,
wherein the optical waveguide is inserted into the horizontal expander layer of the optical coupling layer,
wherein a cross-sectional area of the optical waveguide is less than a cross-sectional area of the optical fiber, and
wherein the optical waveguide has a straight region disposed on an outside of the optical coupling layer, and the optical waveguide has a tapered region disposed in the optical coupling layer and having a less width than the straight region.

11. The optical device of claim 10, wherein the horizontal mode expander layer of the optical coupling layer has:
a waveguide coupling region disposed on the first side facing the vertical mode expander layer and having a first width;
a horizontal expander region connected to the waveguide coupling region and having a first divergence width that gradually increases in a direction away from the waveguide coupling region; and
a vertical expander region connected to the horizontal expander region and having a second width that is greater than the first width.

12. The optical device of claim 11, wherein the tapered region is disposed in the waveguide coupling region restrictively.

13. The optical device of claim 10, wherein a width and a thickness of the horizontal mode expander layer and the vertical mode expander layer the same as a width and thickness of the optical fiber.

14. The optical device of claim 10, wherein the optical waveguide comprises silicon.

15. The optical device of claim 14, wherein the optical coupling layer comprises a silicon oxynitride layer.

16. The optical device of claim 15, wherein the optical fiber comprises silica or a compound having a less refractive index that is less than a refractive index of the silicon and greater than a refractive index of the silicon oxynitride layer.

\* \* \* \* \*